United States Patent [19]

Vergnano

[11] Patent Number: 5,091,235
[45] Date of Patent: Feb. 25, 1992

[54] LAMINATED SILL WRAP ASSEMBLY FOR PROVIDING AN AIR INFILTRATION BARRIER

[75] Inventor: Mark P. Vergnano, Newark, Del.

[73] Assignee: E. I. Du Pont de Nemours and Company, Wilmington, Del.

[21] Appl. No.: 519,075

[22] Filed: May 4, 1990

[51] Int. Cl.[5] ............................................. B32B 23/02
[52] U.S. Cl. ................................ 428/192; 52/169.11; 52/293; 52/408; 428/131; 428/193; 428/252; 428/284; 428/285; 428/343; 428/423.1; 428/914
[58] Field of Search ............... 428/131, 192, 252, 296, 428/284, 285, 343, 423.1, 343, 193; 52/169.11, 293, 408

[56] References Cited

U.S. PATENT DOCUMENTS

| | | | |
|---|---|---|---|
| 1,062,091 | 5/1913 | Foster | 52/408 |
| 1,916,640 | 7/1933 | Rubin et al. | |
| 2,297,058 | 9/1942 | Hasenburger et al. | 52/293 |
| 2,859,487 | 11/1958 | Rovich | 52/293 |
| 3,035,374 | 5/1962 | Allen | 52/293 |
| 3,169,899 | 2/1965 | Steuber | 161/72 |
| 3,835,604 | 9/1974 | Hoffmann, Jr. | 52/105 |
| 4,421,807 | 12/1983 | Clausing et al. | 428/41 |
| 4,488,386 | 12/1984 | Thompson | 52/169.1 |
| 4,509,999 | 4/1985 | Sandor | 156/71 |
| 4,653,241 | 3/1987 | Bindi | 52/169.11 |
| 4,684,568 | 8/1987 | Lou | 428/256 |
| 4,709,523 | 12/1987 | Broderick et al. | 52/406 |
| 4,765,104 | 8/1988 | Boot | 52/143 |

OTHER PUBLICATIONS

Barricade ® Building Wrap Trade Literature from Simplex Products Division Dated 1990.

*Primary Examiner*—James J. Bell

[57] ABSTRACT

A laminated sill wrap assembly for providing an air infiltration barrier between and around the sill plate and foundation wall of a building under construction is disclosed. The sill wrap assembly comprises a batt of infiltration material laminated into a portion of a spunbonded or woven polyolefin sheet. The unlaminated portion of the sheet extends to form a single sealing flap. The flap is provided with an adhesive strip for attaching the flap to an outside wall surface of the building. In use, the laminated portion of the assembly is positioned snugly between the sill plate and foundation interface and the flap is wrapped upwardly around the sill plate and attached to the outside wall surface by the adhesive strip. Once in place, the assembly provides an air infiltration barrier between the inside and outside areas of the building.

14 Claims, 3 Drawing Sheets

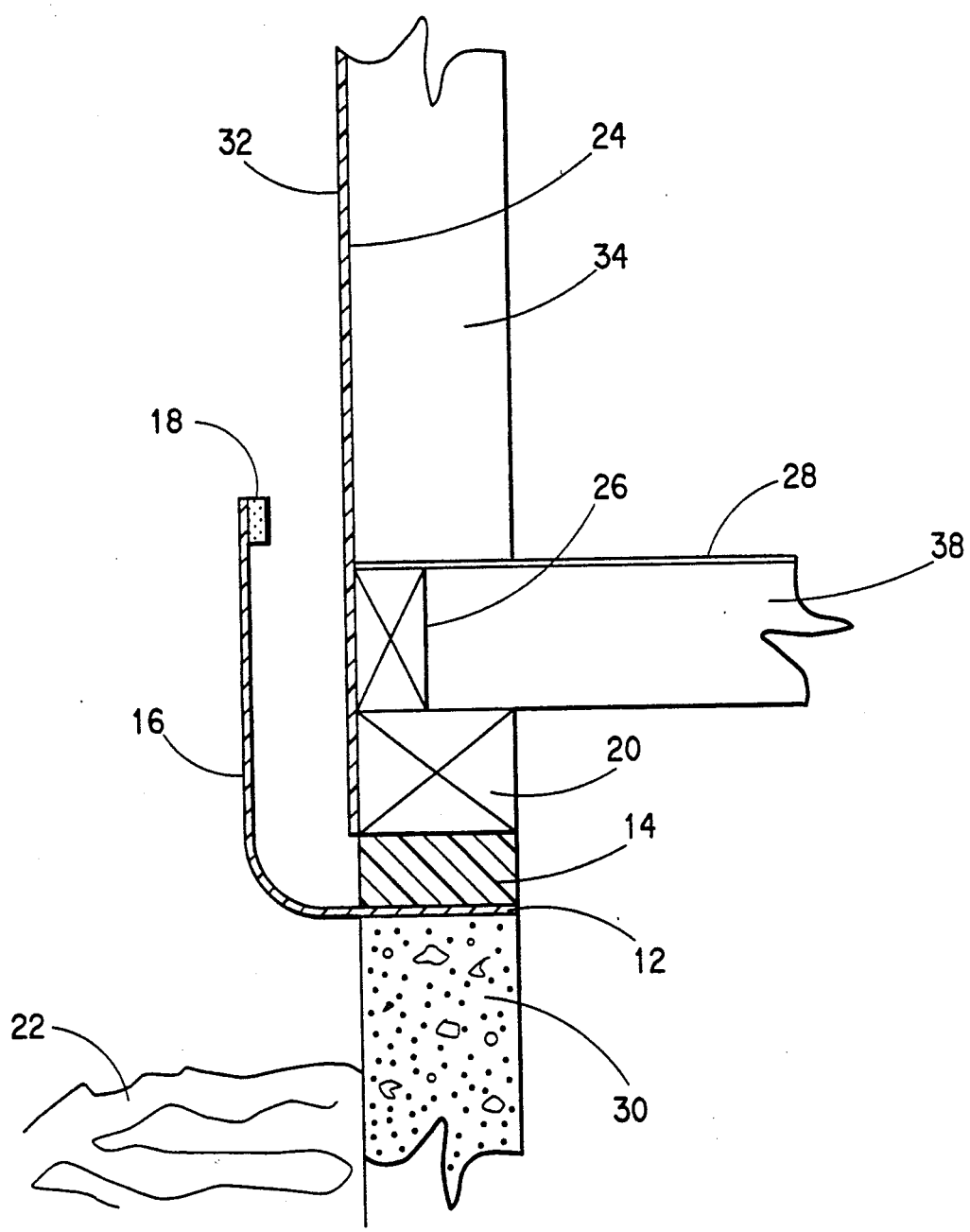

LAMINATED SILL WRAP ASSEMBLY FOR PROVIDING AN AIR INFILTRATION BARRIER

FIELD OF THE INVENTION

The present invention relates to a laminated sill wrap assembly for providing an air infiltration barrier between the inside and outside areas of a house or other building. In particular, the invention relates to an assembly and method for providing an air infiltration barrier between and around the sill plate and foundation interface of a building under construction.

BACKGROUND OF THE INVENTION

It is well known in the building construction art that in seasonal climates a substantial amount of heat loss (i.e., in the winter) and heat gain (i.e., in the summer) occurs around a house, particularly in the basement area. Specifically, heat loss or gain occurs around the floor and wall interface where there is a channeling effect through to the basement or crawl space area. A major cause of such heat loss or gain is air exchange across the sill plate and foundation interface and around the band joist of the house. As a result, there has long existed a need to provide an air infiltration barrier to combat leakage at the sill plate and foundation interface and around the band joist area.

Over the years many devices and methods have been suggested for solving this problem. For example, U.S. Pat. No. 3,035,374 discloses a leakage preventing draft stop which comprises a batt of insulation which covers and is fastened over one complete side of a cardboard backing panel. Bendable attaching flaps extend from the backing panel and are adhesively coated. In use, the draft stop is sized to fit and positioned between the parallel wooden joists which support the subfloor of the house. The insulation contacts the interior surface of the concrete foundation so that it overlaps the sill plate and foundation interface. Once in place, the flaps are bent and adhesively attached to the subfloor and joists.

Moreover, U.S. Pat. No. 4,653,241 discloses a system for insulating the interior surface of basement walls. This system comprises a continuous roll of flexible insulation having an impermeable vapor barrier continuously laminated on one side thereof and in intimate contact therewith. The laminate is fastened to the interior surface of the basement wall in sections cut to the dimensions of the basement walls.

A failure of these types of devices and/or systems is that they only attempt to stop drafts once they have actually reached the interior surfaces of the house. Moreover, since these types of devices and/or systems are designed for use after construction of the house is substantially complete, nothing is provided for preventing drafts between and around the sill plate and foundation interface, wherein the method is practiced while the house is under construction.

In addition, there are articles and methods available which attempt to simply plug the space between the sill plate and the foundation wall. For example, batts of commercially available fiberglass or foam insulation have been used for this purpose. However, this method does not completely seal the area surrounding the sill plate and foundation interface and air is still permitted to leak into and out of the house.

Clearly, what is needed is a device and method which overcome the problems inherent in the prior art and which provide an air infiltration barrier wherein drafts are prevented before they pass into or out of the house. It is therefore an object of the present invention to provide an assembly and method for providing an air infiltration barrier which completely seals the sill plate and foundation interface and its surrounding areas and which prevents air exchange between the inside and outside areas of the house. Other objects and advantages of the invention will become apparent to those skilled in the art upon reference to the attached drawings and to the detailed description of the invention which hereinafter follows.

SUMMARY OF THE INVENTION

In accordance with the invention, there is provided a laminated sill wrap assembly for use in providing an air infiltration barrier between and around the sill plate and foundation of a building under construction. The sill wrap assembly comprises a batt of infiltration material laminated onto a face portion of a spunbonded or woven polyolefin sheet. The unlaminated portion of the sheet extends to form a single sealing flap. Optionally, the sealing flap is further provided with an adhesive strip for sealing the flap onto an outside wall surface of the building.

In addition, the invention also provides a method for providing an air infiltration barrier between and around the sill plate and foundation interface of a building under construction. The method comprises, as a first step, positioning a laminated sill wrap assembly snugly between the sill plate and foundation interface. The assembly comprises a spunbonded or woven polyolefin sheet having laminated onto a face portion thereof a batt of infiltration material. The unlaminated portion of the sheet extends to form a single sealing flap. The sealing flap further comprises means for sealing the flap onto an outside wall surface of the building. The assembly is positioned so that the sheet side of the laminate contacts the foundation and the infiltration material contacts the sill plate. After the assembly is in position, the method further comprises the steps of wrapping the sealing flap upwardly around the sill plate and attaching the sealing flap to the outside wall surface of the building by contacting the wall surface with the sealing means. Thereafter, the sealing flap may be covered by a suitable building siding as the construction of the building continues towards completion. When the assembly is used as described above, and installed around the entire building, the assembly provides a continuous air infiltration barrier between the inside and outside areas of the building.

As used herein, "infiltration material" means any material which prevents or minimizes the exchange of air or thermal energy between the inside and outside areas of a building. By way of example and not by way of limitation, "infiltration material" includes fiberglass insulation, polymer foam insulation, and cellulose insulation.

As used herein, "air infiltration barrier" means a physical barrier which substantially prevents both outside and inside air from passing therethrough. In its broad sense, the barrier prevents air exchange between the outside and inside areas of the building.

BRIEF DESCRIPTION OF THE DRAWINGS

The invention will be better understood by referring to the attached drawings wherein:

FIG. 3 is an enlarged view of the area between and around the sill plate and foundation wall of FIG. 2 illustrating the use of the assembly in greater detail.

DETAILED DESCRIPTION OF THE PREFERRED EMBODIMENT

Figure 1:
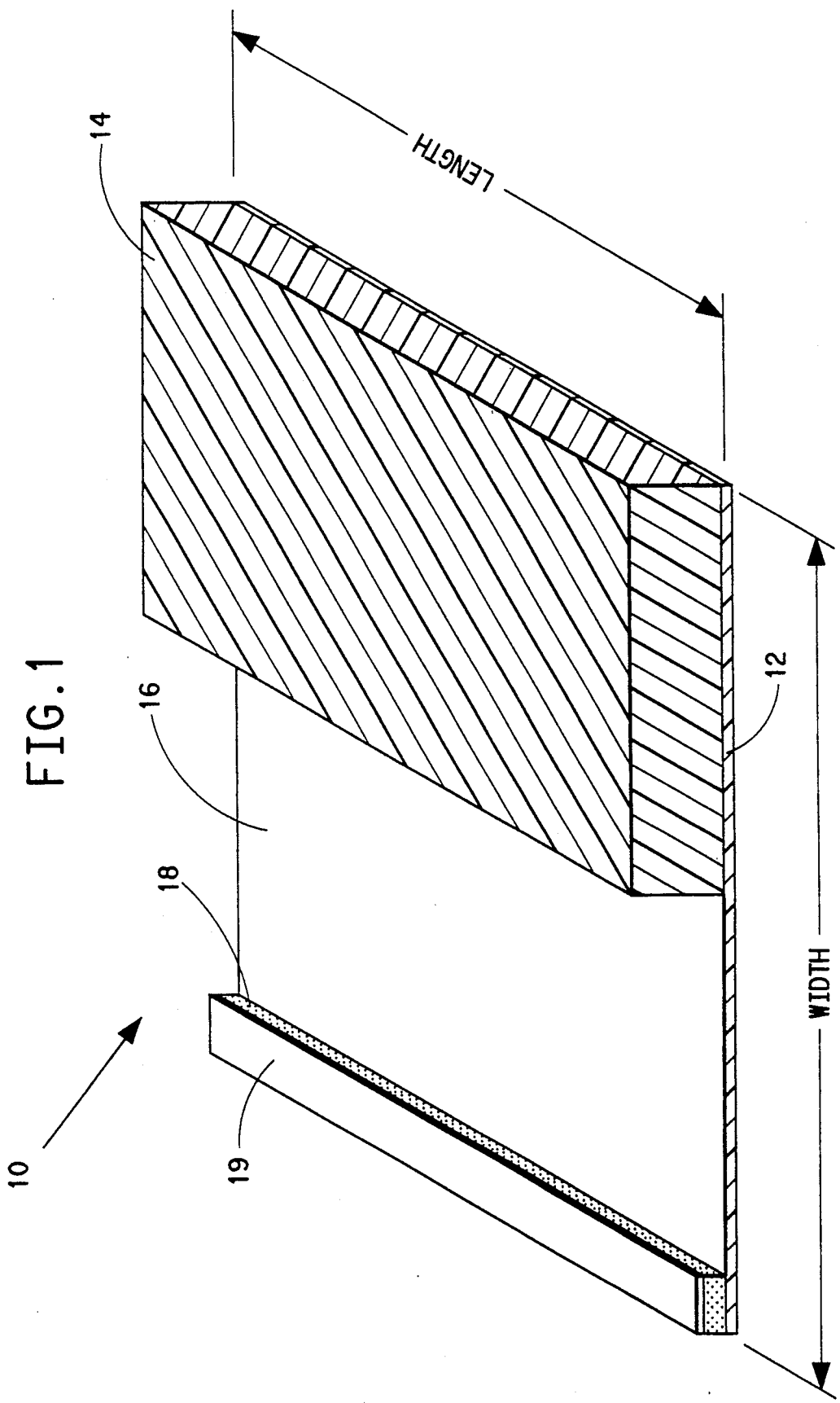
FIG. 1 is a plane view of a preferred sill wrap assembly in accordance with one embodiment of the invention.

Referring now to the drawings, wherein like reference numerals designate like elements, a preferred embodiment of the inventive sill wrap assembly is shown in FIG. 1.

FIG. 1 illustrates a sill wrap assembly 10 which provides an air infiltration barrier when positioned between the interfacial area of the sill plate 20 and the foundation wall 30 of a house 40. The sill wrap assembly 10 comprises a spunbonded or woven polyolefin sheet 12 having laminated to an upper face portion thereof a batt of infiltration material 14. Preferably, the sheet 12 is rectangular and has a length substantially greater than its width. In the preferred embodiment, the sheet is about 30 cm wide in order to accomodate the standard wall thickness of most house foundations. The infiltration material 14 is laminated to the sheet 12 along the entire length of the sheet, but only along about half the width of the sheet 12 so as to form a single sealing flap 16. In the preferred embodiment, the batt of infiltration material is about 15 cm wide and about 7 cm thick, although the exact dimensions are not critical to the invention. For example, the thickness of the batt may vary depending on the gap between the sill plate 20 and the foundation wall 30. Optionally, a narrow strip of double-sided adhesive tape 18 is applied to the outer edge of the upper face surface of the sealing flap 16 in order to attach the flap to the outer surface of the house 40 when in use. It will be understood that other sealing means may be substituted for the adhesive strip 18. Preferably, a strippable release liner 19 covers the tape 18 until it is removed just prior to use.

Preferably, the infiltration material 14 is comprised of a commercially available fiberglass, cellulose or polymer foam insulation, although other materials and/or combinations of materials are also acceptable. Suitable polymer foams include polyethylene, polystyrene and polyurethane.

The sheet 12 is preferably comprised of spunbonded non-woven polyolefin film-fibrils of the type disclosed in U.S. Pat. No. 3,169,899 or of a vapor-permeable fabric of the type disclosed in U.S. Pat. No. 4,684,568, the contents of which are both incorporated by reference herein. Polyethylene and polypropylene are the polyolefins of choice. A commercial spunbonded non-woven polyethylene film-fibril sheet product sold by E. I. du Pont de Nemours and Company under the trademark TYVEK ® is particularly suitable for this application. TYVEK ® spunbonded polyolefin sheets are lightweight and have outstanding mechanical properties while also having good tolerance to ordinary weather conditions. A particularly preferred sheet product is TYVEK ® Housewrap 1055B, due to its advantageous moisture vapor transmission rate which has been measured using ASTM E-96 Method B to be between 606 and 733 g/m$^2$-24 hrs. TYVEK ® Housewrap 1055B has a thickness of between 0.096 and 0.164 mm and a basis weight of about 50.8 g/m$^2$.

The sheet 12 may also be comprised of woven polyolefin film strips. A commercial sheet product made from woven strips of polyethylene and sold by Simplex Products Division of Adrian, Missouri under the trademark Barricade ® Building Wrap, is also suitable for this application. Barricade ® Building Wrap allows harmful moisture to escape from a building while still providing an effective air infiltration barrier. Barricade ® Building Wrap has been measured using ASTM F-96 to have a moisture vapor permeability of over 70 g/m$^2$-24 hrs.

Figure 2:
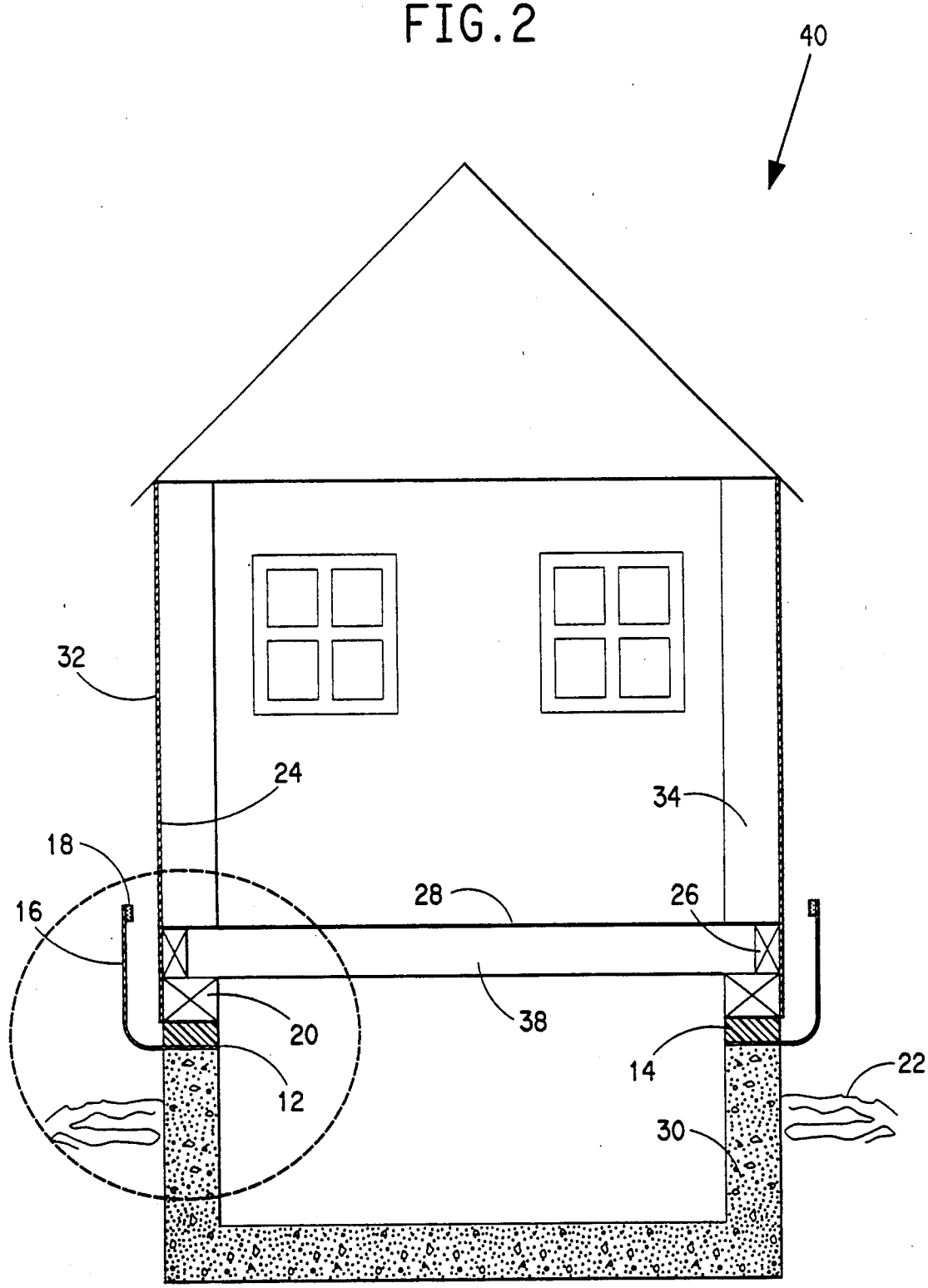
FIG. 2 is a cross-sectional view showing the sill wrap assembly positioned snugly between the interface of the sill plate and the concrete foundation wall of a residential house under construction.

Referring now to FIG. 2, the laminate assembly 10 is shown being used by positioning it snugly between the interface of the sill plate 20 and the foundation wall 30 of the house 40 under construction. Normally, the foundation wall 30 will rise above the surrounding ground level 22. When snugly in place, the infiltration material 14 contacts the sill plate 20 and the sheet 12 contacts the foundation wall 30. Once in position, the sheet flap 16 is wrapped upwardly around the sill plate 20 and attached to the outer wall surface 24 of the house by the adhesive strip 18. Advantageously, the sheet flap 16 extends so that it is attached to the outer wall surface 24 above the level of the band joist 26, the floor joist 38 and the subfloor 28. In this manner, a more complete seal is formed around other building areas prone to air infiltration. Preferably, the outer wall surface 24 of the house is already wrapped by a layer of TYVEK ® housewrap 32 in order to substantially seal the house walls 34 from air infiltration. If this is the case, the sealing flap 16 is attached directly to the housewrap layer 32 instead of the outer wall surface 24. Following attachment, the assembly creates a complete seal between and around the sill plate 20 and foundation wall 30 interface and provides an air infiltration barrier between the outside and inside areas of the house 40. Thereafter, the sheet flap 16 may be covered by paneling, bricks or other suitable house siding as the construction of the house continues towards completion.

Referring now to FIG. 3, an enlarged view of the area between and around the sill plate 20 and foundation wall 30 interface (designated by the dotted circle in FIG. 2) is shown. The laminated portion of the assembly comprising elements 12 and 14 is shown positioned snugly between the sill plate 20 and the foundation wall 30. In this manner, the sheet 12 contacts the foundation wall 30 and the infiltration material 14 contacts the sill plate 20. Once in place, the sill plate 20 is sealed by wrapping the sealing flap 16 upwardly and attaching the flap to the outside wall surface 24 (or to the optionally present housewrap layer 32) of the house by the adhesive strip 18. As noted above, the sealing flap 16 is advantageously attached above the level of the band joist 26, the floor joist 38 and the subfloor 28.

Although a particular embodiment of the present invention has been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the present invention.

I claim:

1. A laminated sill wrap assembly for providing an air infiltration barrier between and around the sill plate and foundation interface of a building under construction comprising:
(a) a spunbonded polyolefin sheet;
(b) a batt of infiltration material which is laminated onto a face portion of the sheet along the entire length of the sheet, but only along a portion of the width of the sheet starting from one edge of the sheet, such that a single sealing flap is formed where the infiltration material is not laminated onto the sheet.

2. An assembly according to claim 1 further comprising an adhesive strip provided along the outer edge of the sealing flap for sealing the flap to an outside wall surface of the building.

3. An assembly according to claim 1 wherein the sheet is comprised of spunbonded non-woven polyolefin film-fibrils.

4. An assembly according to claim 1 wherein the polyolefin is selected from the group consisting of polyethylene and polypropylene.

5. An assembly according to claim 1 wherein the infiltration material is comprised of a member selected from the group consisting of fiberglass insulation, polymer foam insulation and cellulose insulation.

6. An assembly according to claim 2 wherein the adhesive strip further comprises a strippable release liner which is made removable prior to attaching the sealing flap to the outside wall surface of the building.

7. A laminated sill wrap assembly for providing an air infiltration barrier between and around the sill plate and foundation interface of a building under construction comprising:
(a) a woven polyolefin sheet;
(b) a batt of infiltration material which is laminated onto a face portion of the sheet along the entire length of the sheet, but only along a portion of the width of the sheet starting from one edge of the sheet, such that a single sealing flap is formed where the infiltration material is not laminated onto the sheet.

8. A method for providing an air infiltration barrier between and around the sill plate and foundation interface of a building under construction comprising the steps of:
(a) positioning a laminated sill wrap assembly between the sill plate and foundation interface, the assembly comprising:
(i) a spunbonded polyolefin sheet;
(ii) a batt of infiltration material which is laminated onto a face portion of the sheet along the entire length of the sheet, but only along a portion of the width of the sheet starting from one edge of the sheet, such that a single sealing flap is formed where the infiltration material is not laminated onto the sheet; and
(iii) means for sealing the sheet flap onto an outside wall surface of the building; such that the sheet side of the laminate contacts the foundation and the infiltration material side of the laminate contacts the sill plate;
(b) wrapping the sealing flap upwardly around the sill plate; and
(c) attaching the sealing flap to the outside wall surface of the building by contacting the wall surface with the sealing means.

9. A method according to claim 8 wherein the sheet is comprised of spunbonded non-woven polyolefin film-fibrils.

10. A method according to claim 8 wherein the polyolefin is selected from the group consisting of polyethylene and polypropylene.

11. A method according to claim 8 wherein the infiltration material is comprised of a member selected from the group consisting of fiberglass insulation, polymer foam insulation and cellulose insulation.

12. A method according to claim 8 wherein the sealing means comprises an adhesive strip attached to the outer edge of the sealing flap.

13. A method according to claim 12 wherein the adhesive strip further comprises a strippable release liner which is made removable prior to attaching the sealing flap to the outside wall surface of the building.

14. A method for providing an air infiltration barrier between and around the sill plate and foundation interface of a building under construction comprising the steps of:
(a) positioning a laminated sill wrap assembly between the sill plate and foundation interface, the assembly comprising:
(i) a woven polyolefin sheet;
(ii) a batt of infiltration material which is laminated onto a face portion of the sheet along the entire length of the sheet, but only along a portion of the width of the sheet starting from one edge of the sheet, such that a single sealing flap is formed where the infiltration material is not laminated onto the sheet; and
(iii) means for sealing the sheet flap onto an outside wall surface of the building; such that the sheet side of the laminate contacts the foundation and the infiltration material side of the laminate contacts the sill plate;
(b) wrapping the sealing flap upwardly around the sill plate; and
(c) attaching the sealing flap to the outside wall surface of the building by contacting the wall surface with the sealing means.

* * * * *